United States Patent [19]

Cunningham

[11] Patent Number: 5,480,233
[45] Date of Patent: Jan. 2, 1996

[54] THRUST BEARING FOR USE IN DOWNHOLE DRILLING SYSTEMS

[76] Inventor: James K. Cunningham, P.O. Box 126, 504 E. Main, Big Cabin, Okla. 74332

[21] Appl. No.: 323,141

[22] Filed: Oct. 14, 1994

[51] Int. Cl.⁶ .................................................. F16C 17/04
[52] U.S. Cl. ........................................ 384/308; 384/304
[58] Field of Search ................................ 384/308, 304, 384/303, 305, 907.1, 420

[56] References Cited

U.S. PATENT DOCUMENTS

| | | | |
|---|---|---|---|
| T102,901 | 4/1983 | Offenbacher | 29/149 |
| 4,410,054 | 10/1983 | Nagel et al. | 175/107 |
| 4,468,138 | 8/1984 | Nagel | 384/303 |
| 4,620,601 | 11/1986 | Nagel | 175/107 |
| 4,629,013 | 12/1986 | Krueger | 384/308 |
| 4,708,496 | 11/1987 | McPherson | 384/303 |
| 5,092,687 | 3/1992 | Hall | 384/303 |

*Primary Examiner*—Lenard A. Footland
*Attorney, Agent, or Firm*—John D. Gassett; Frank J. Catalano; Scott R. Zingerman

[57] ABSTRACT

A thrust bearing for use in downhole drilling systems employing fluid motors having a stator retaining ring and a rotor retaining ring. These rings have a plurality of bearing inserts. The bearing insert surfaces of the rotor contact the bearing surfaces of the stator. The studs which make up the bearing surface have a threaded bolt secured thereto. The threaded bolt extends through a plurality of threaded holes in each of the retaining rings. The studs and bolt may be removed or inserted by use of a simple hand tool, such as an Allen wrench.

8 Claims, 3 Drawing Sheets

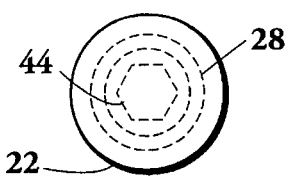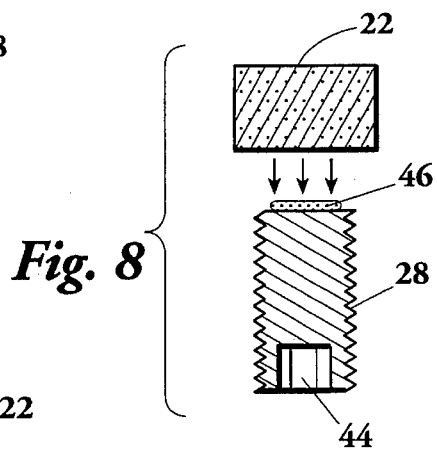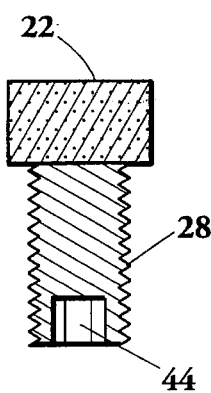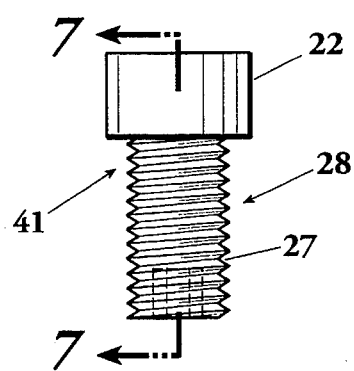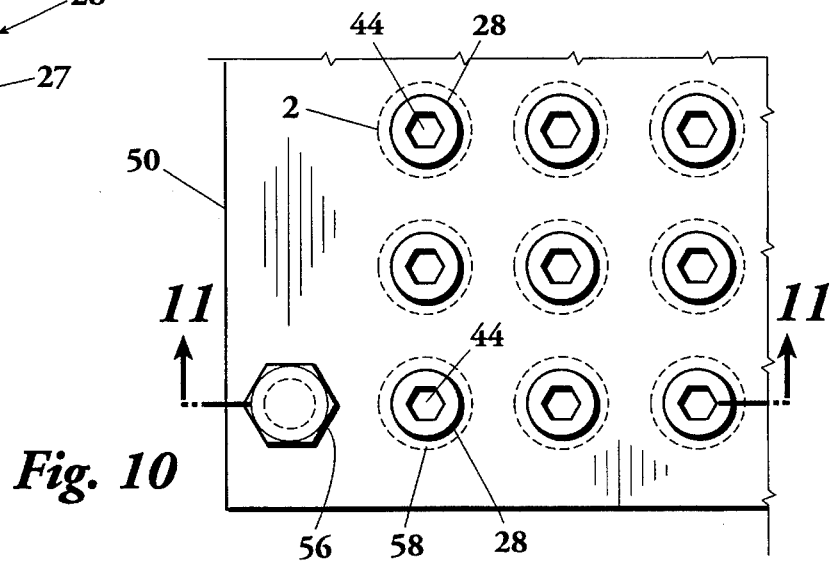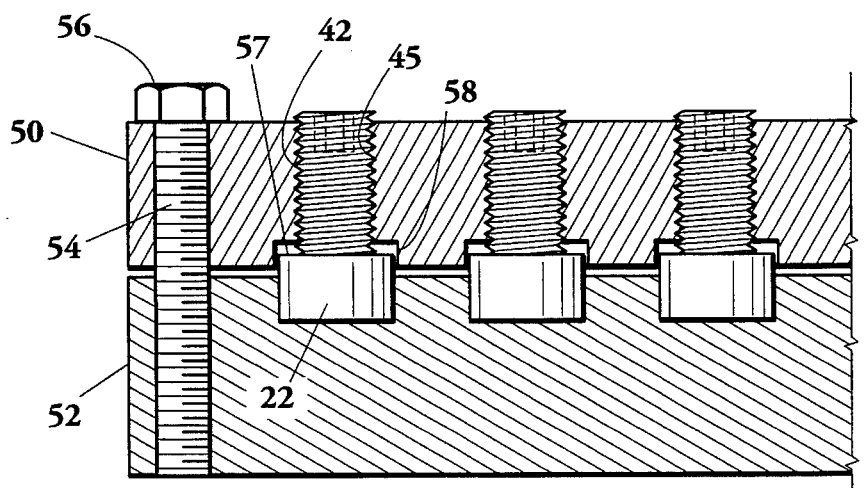
Fig. 9
Fig. 8
Fig. 7
Fig. 6
Fig. 10
Fig. 11

THRUST BEARING FOR USE IN DOWNHOLE DRILLING SYSTEMS

BACKGROUND OF THE DISCLOSURE

This subject invention relates to bearings and more particularly to thrust bearings as employed, for example, in the downhole drilling art.

Downhole drilling motors have been in use for quite some time in the drilling of boreholes in the earth, especially for oil and/or gas. In a typical downhole drilling motor, the motor is suspended at the lower end of a string of drill pipe which is a series of pipe sections connected together at joints and supported from the surface. A drill bit is supported at the lower end of the downhole motor. Drilling fluid, which is commonly called drilling mud, is circulated down through the pipe string through the motor to cause it to rotate the drill bit. Then the drilling fluid is returned to the surface through the annular space between the drilled borehole and the drill string. The circulating drilling fluid causes the downhole fluid motor to rotate, thus rotating the bit to drill the borehole, and then carry the cuttings of the drilling operations back to the surface.

Virtually all downhole drilling motors have vertical thrust bearings. These downhole motors have stators and rotors. There is a rotor disc which rotates with the shaft of the downhole fluid motor and a stator disc which does not rotate and is supported next to the motor housing. In a typical setting, the stator disc and the rotor disc are each provided with a plurality of hard bearing surfaces such as diamond studs. The stator disc and rotor disc are placed in adjacent positions so that the diamond studs of each contact the other to form the bearing contacts. U.S. Pat. No. 4,410,054, entitled: "Well Drilling Tool with Diamond Radial/Thrust Bearings" describes one of the prior art diamond thrust bearings for downhole drilling fluid motors. U.S. Pat. No. 4,468,138, entitled "Manufacture of Diamond Bearings", describes a prior art method of securing a diamond bearing to a supporting plate or ring in a plurality of recesses. This requires that the assembly be heated to a specified temperature so that the metal pad softener melts and allows the metal pads to extrude around and braze the diamond bearing inserts in place. When the assembly is cooled, the bearing's inserts have their diamond bearing faces locked in a co-planar relation by the extruded metal from the metal pads. When these bearings or diamond inserts wear out, the whole retainer rings must be replaced. There is no way of replacing the diamond inserts in the field.

SUMMARY OF THE INVENTION

This is a novel thrust bearing for use in downhole drilling motors. The thrust bearing includes a plurality of diamond bearing inserts, each insert including a stud having a diamond bearing surface and a threaded bolt of lesser diameter than the stud secured to the base of the stud. It includes an annular stator retainer, an annular bearing or disc, and an annular rotor bearing disc to hold the diamond bearings. Each disc has a plurality of holes therethrough. Each such hole has a first portion of approximately the same size diameter as that of the stud and a second portion which is a smaller diameter and is threaded to threadedly receive the threaded bolt. At the juncture of the two diameters of the hole there is an annular shoulder. The diamond bearing insert is inserted through the larger hole, and the threaded bolt screwed into the threaded portion of the hole. The end of the threaded bolt opposite the stud is provided with an insert to receive a wrench such as an Allen wrench which is used to tighten the diamond bearing insert until the base of the stud is secured tightly against the annular shoulder.

The stator disc and the rotor discs are secured in the bearing section of the downhole drilling motor between the center shaft and the outer housing in such a manner that the diamond studs of the stator disc is in contact with the diamond studs of the rotor disc, thus forming a bearing.

Each diamond stud is brazed to a threaded bolt. The jig for making this brazing is provided. It includes an upper plate having a plurality of holes of approximately the diameter of the hex bolts opening to the top and a plurality of recesses aligned with each said hole to receive said diamond stud. The diameter of the recesses is greater than that of the opening. A second plate has a plurality of upwardly opening recesses to mate with the recesses in the upper plate. Means are provided to secure the lower plate to the upper plate. A suitable solder paste is positioned on the top of the threaded bolt such that when the upper retainer plate is placed thereon the solder being squeezed between the stud and the threaded bolt. The resulting assembly is then placed in an oven such as the kind to heat ceramic products and is raised to a suitable temperature, e.g. about 1100° F., and is held there for a sufficient time for the solder to melt and adhere to the stud and to the threaded bolts so that it becomes an integral insert.

The resulting insert units are then installed in the rotor disc and the stator disc. Then the resulting diamond studded rotor and diamond stator discs are inserted into the bearing unit of the downhole drilling motor. When these diamond bearings wear out, new diamond inserts can be easily made in the field. The old worn out studs are removed by the use of a hexagonal wrench or other type wrench to match the recess in the bolt to remove the diamond inserts. When these are removed, new diamond inserts are screwed into position as described above, and the same annular ring of the stator disc and rotor disc are ready to be reinserted into the thrust bearing section.

An object of the invention is to provide a thrust bearing for a downhole motor in which the bearing surfaces can be readily replaced in the stator and rotor annular rings.

It is a further object of this invention to provide diamond bearing inserts which can be removed from and new insert put into annular bearing stator and rotor discs without the use of a heating oven.

These and other objects will be apparent from the following description taken in conjunction with the drawings, in which:

BRIEF DESCRIPTION OF THE DRAWINGS

FIG. 6 is a view of only the diamond bearing insert showing the diamond stud and the threaded bolt.

FIG. 7 is a view taken along the line 7—7 of FIG. 6.

FIG. 8 is similar to FIG. 7 except that it is in an exploded view showing the studs and the solder on top of the threaded bolt.

FIG. 9 is a top view of FIG. 6.

FIG. 10 is a top view of a portion of an assembly for manufacturing the bearing inserts shown in FIG. 6.

FIG. 11 is a view taken along the line 11—11 of FIG. 10.

DESCRIPTION OF THE PREFERRED EMBODIMENT

Figure 1:
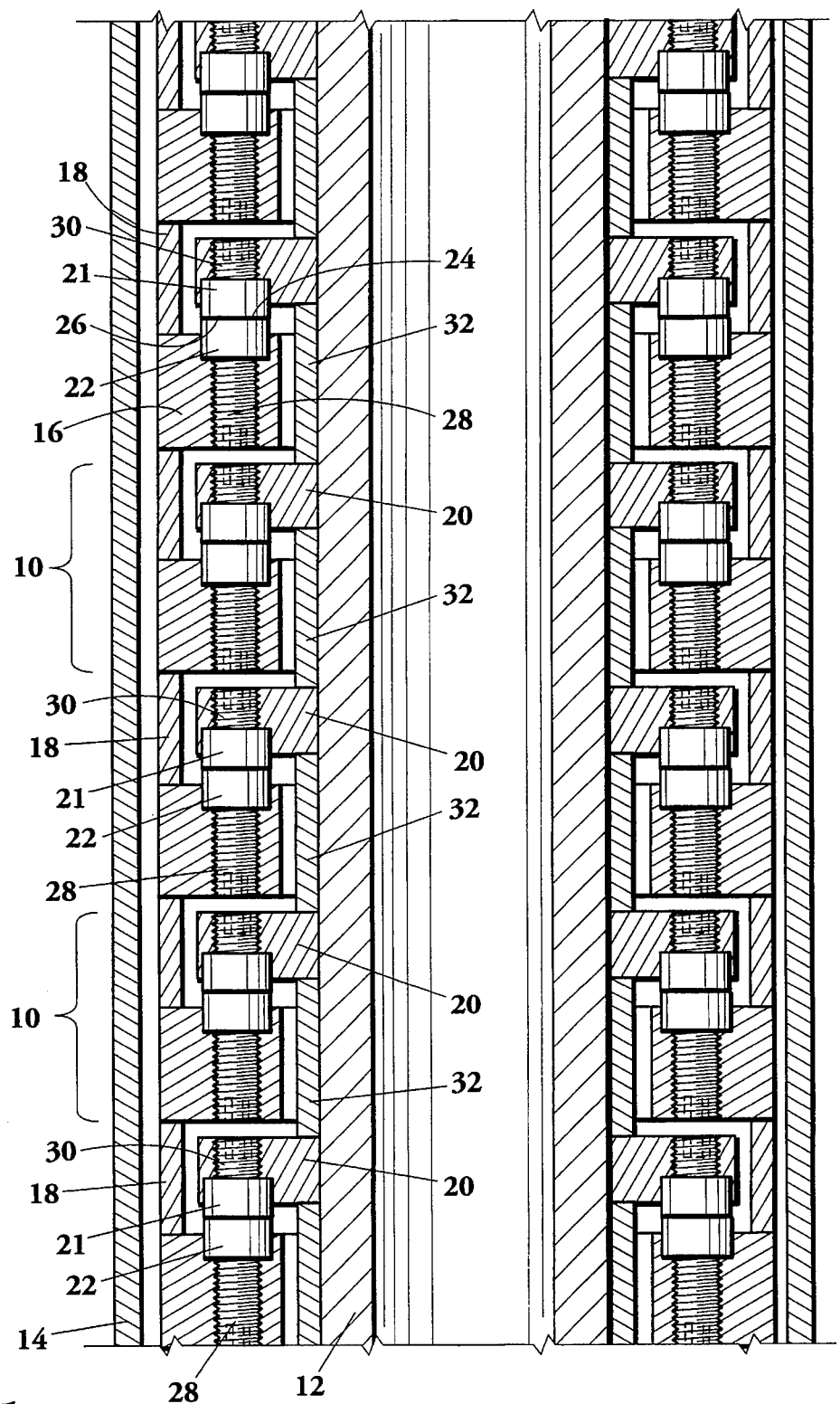
FIG. 1 illustrates a portion of a thrust bearing section of a downhole drilling fluid motor.

Attention is next directed to FIG. 1 which shows a portion of a thrust bearing section for a downhole fluid drilling motor which includes a plurality of bearing units 10, a hollow shaft 12, and an outer housing or body 14. Each bearing 10 has a stator disc 16 and a rotor disc 20. Stator disc 16 is provided with a stud 22 having a bearing surface 24 which is preferably a diamond type surface. The stud 22 is secured to a bolt 28 which is threadedly secured in a threaded hole in stator disc 16. The stator discs 16 are held in position by stator spacers 18. There are any desired number of such stator discs 16, and they are held in place in a conventional manner by a shoulder (not shown) at the bottom of body 14 and a nut (not shown) at the top of body 14 which is tightened to secure the spacers and stator disc. Thus the stators are rigidly held in position.

There is a rotor disc 20 for each stator disc 16. Each rotor disc is provided with a stud 21 having a diamond bearing surface 26. The stud 21 is secured to a bolt 30 which is screwed into a threaded hole in the rotor disc 20. The rotor disc 20 is held in position by a plurality of rotor spacers 32. These spacers and rotor discs are held in position by a shoulder at the bottom of the shaft 12 and by a nut (not shown) at the top of the shaft.

By tightening this nut and the nut on the body, the stator disc and the rotor disc are held firmly in position with the diamond surfaces contacting each other in a bearing manner.

Figure 2:
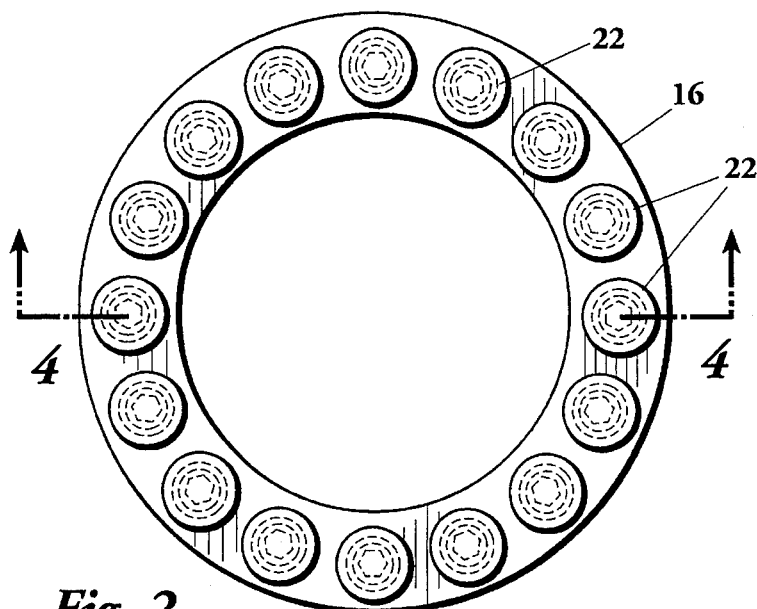
FIG. 2 illustrates a top view of the stator disc with diamond bearing studs inserted.
Figure 4:
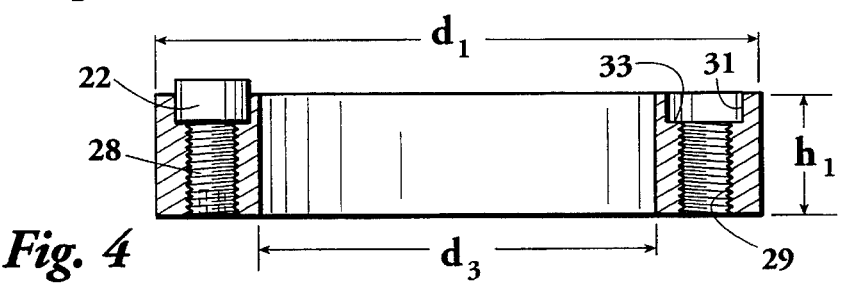
FIG. 4 is a view taken along the line 4—4 of FIG. 2.

Attention is next directed to FIGS. 2 and 4 to show a top view of the stator disc 16 and a section through that view. The stator disc 16 is provided with a plurality of passages therethrough which is shown in FIG. 4 as an upper hole 31 having a larger diameter than lower threaded hole 29, thus forming a shoulder 33. The stator disc has a plurality of diamond bearing inserts such as shown in FIG. 6. The threads 28 are screwed in until the bottom of stud 22 rests on shoulder 33. The threads hold the bolt 28 and the stud 22 in position, and shoulder 33 absorbs thrust forces from the stud 22. The axis of bolt 28 is preferably parallel to the axis of the hole in its associated disc, either rotor disc 20 or stator disc 16.

Figure 3:
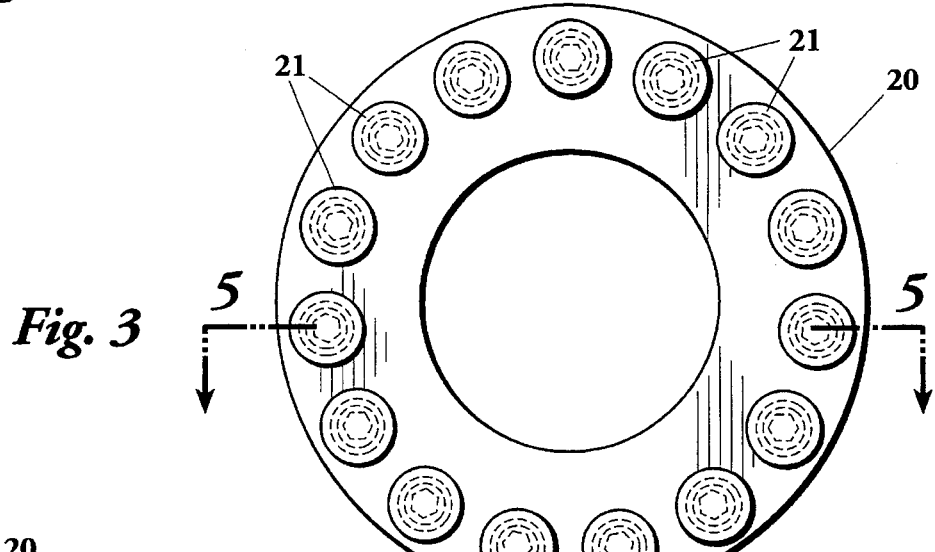
FIG. 3 is a rotor disc similar to the stator disc of FIG. 2.
Figure 5:
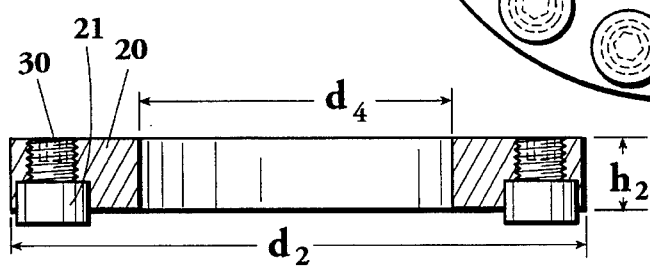
FIG. 5 is a view taken along the line 5—5 of FIG. 3.

FIGS. 3 and 5 show the rotor disc in full view and in a section taken along the line 5—5 of FIG. 3. This shows the diamond inserts are secured to holes in rotor disc 20 similarly to the securing of the diamond inserts in the stator disc 16. In both the stator and rotor disc the flat diamond faces lie substantially in a plane.

In a typical rotor and stator disc, there is a different number of diamond studs in the rotor disc from that of the stator disc. In one typical stator disc 16, the outer diameter $d_2$ is 5,312", and the inner diameter $d_3$ of the passage is 3.51", the thickness of the disc $h_2$ is 1.00", the diameter of the bolt 28 is about 0.375", and the depth to shoulder 33 is about 0.25". In the rotor disc the outer diameter $d_2$ of a typical unit is 5,562", and the inner diameter $d_4$ is 4.04". The thickness $h_2$ of the rotor disc is 1.00". The depth of the hole 31 into which stud 21 goes is the same as that of the depth to the shoulder 33. Studs 21 and 22 extend above the surface of discs 16 and 20 to have full benefit of the bearing surface of the studs. These dimensions are not to be limiting in any manner but are merely descriptive for purposes of exemplification and visualization.

The stator disc and the rotor disc shown in FIGS. 2, 3, 4, and 5 are the discs which are used in the bearing section illustrated in FIG. 1. When the bearing surfaces on the studs wear down, the stud such as shown in FIG. 6 can be removed from each stator disc and each rotor disc and replaced with new insert units having new diamond studs 22. These can be done at a remote well site very easily merely by using a hex wrench, such as an Allen wrench, to remove the bolts and studs after the bearing unit has been brought to the surface and dismantled. Then new inserts can be inserted into the rotor and stator disc using only the same tool which removes the worn out diamond bearing inserts. Thus no spare stator discs or rotor discs are required for this change out such as is presently done in conventional units which require the use of a new disc, stator, and rotor each time that the diamond bearing inserts wear out.

Attention is now directed to FIGS. 6–11 to illustrate a preferred method of manufacturing the diamond bearing insert 41 as shown in FIG. 6 and used in the stator disc 16 and the rotor disc 20. In FIG. 6 there is a bolt 28 and stud 22. The stud 22 has a diamond surface on it and is commercially available from General Electric. These studs can vary in size but are typically about 0.50" in diameter and 0.375" high. Bolt 28 is typically 0.375" in diameter and 0.75" long for the stator disc and 0.75" for the rotor disc and has a hex socket 44 for receiving the hex wrench such as an Allen wrench.

As shown in FIG. 8, in cross section, a solder paste 46 is positioned on top of the threaded bolt 28 with thread 27, and the stud 22 is then placed thereon. Then while the stud 22 is held firmly against the solder, the stud and bolt are heated to a sufficient degree to bond the two together. A suitable solder is Easy Flo 45 (a silver solder available in paste form).

A jig for use in manufacturing the diamond insert of FIG. 6 is shown in FIGS. 10 and 11. There is a lower plate 52 and an upper plate 50 as shown particularly in FIG. 11. The lower plate 52 has a plurality of receiving holes to receive the stud 22, and upper plate 50 has a plurality of holes having threads 45 to receive the threads 42 of the bolts. There is a hole at the lower end of the threaded hole 42 of a size to which the diamond stud 22 can fit. The diamond stud 22 is positioned in the holes in lower plate 52. Bolts 28 are then threaded into the threaded hole 42 with solder 46 placed between the end of the bolt and the diamond stud 22. After all the desired number of bolts 28 and studs 22 are positioned as just described and shown in FIG. 11, a plurality of bolts 56, having threads 54, threadedly extend through threaded holes in the upper plate and the lower plate. Bolt 56 is tightened to hold the two plates in a fixed and firm position so that the bolts 28 and the studs 22 are held in the proper and firm position. It is noted there is a space shown between the annular surface 57 of stud 22 and the top of the hole 58. This is to prevent the solder, when heated, from flowing against the upper plate, thus causing the stud to be soldered to the upper plate. When the upper plate and lower plate are secured together when all the studs and bolts are in, the resulting unit is then heated to a suitable temperature which can conveniently be done by placing the resulting unit in a ceramic heating oven. The entire unit is then raised to a suitable temperature for a suitable length of time to cause the solder to firmly connect the studs 22 to the bolts 28. Typically the temperature for the paste solder would be about 1100° F. and held there for about three to five minutes. Any desired size jig can be used and can be adjusted or modified to accommodate any selected size bolts, diamond studs and selected solder.

While the invention has been described with a certain degree of particularity, it is manifest that many changes may be made in the details of construction without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed:

1. A thrust bearing for use in downhole drilling systems which comprises:

a plurality of diamond bearing inserts, each insert including (i) a stud having a bearing surface and (ii) a threaded bolt secured to said stud;

an annular retainer having a plurality of holes therethrough, each such hole having a first portion approximately the size of the diameter of said stud and a second portion which is of a smaller diameter and is threaded to threadedly receive said threaded bolt.

2. A thrust bearing as defined in claim 1 including two annular retainers, one retainer having a different number of holes therein than the other retainer.

3. A thrust bearing as defined in claim 1 in which one end of said threaded bolt is provided with a Allen hex recess.

4. A thrust bearing as defined in claim 1 in which a soldered connection connects the threaded bolt to the stud.

5. A thrust bearing for use in a downhole drilling system which comprises:

a plurality of bearing inserts, each such insert having i) a stud having a hard bearing surface and ii) a threaded bolt secured at one end to said stud and the other end of said bolt having a fitting so that said bolt may be rotated; and a stator retaining disc and a rotor retaining disc, each disc having a plurality of holes therethrough, at least a section of each said hole having threads to threadedly receive said thread bolt.

6. A thrust bearing as defined in claim 5 in which the hard bearing surface is a diamond surface and said stator retaining disc and said rotor retaining disc have different numbers of diamond bearing inserts.

7. A thrust bearing as defined in claim 5 in which the fitting in said bolt is a hex recess which can receive an Allen wrench.

8. A thrust bearing as defined in claim 5 in which each said disc is annular.

* * * * *